Nov. 4, 1924.　　　　　　　　　　　　　　　1,514,570
G. H. ROOSEVELT
AUTOMATIC RECLOSING CIRCUIT BREAKER SYSTEM
Filed Aug. 7, 1923
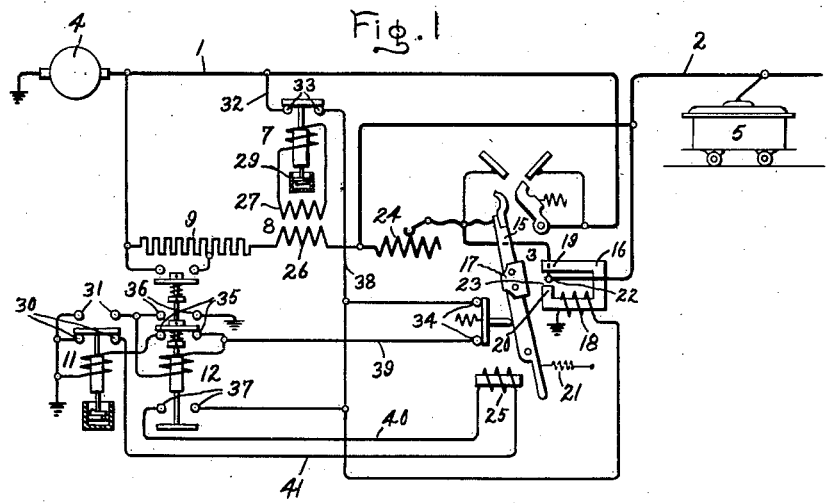
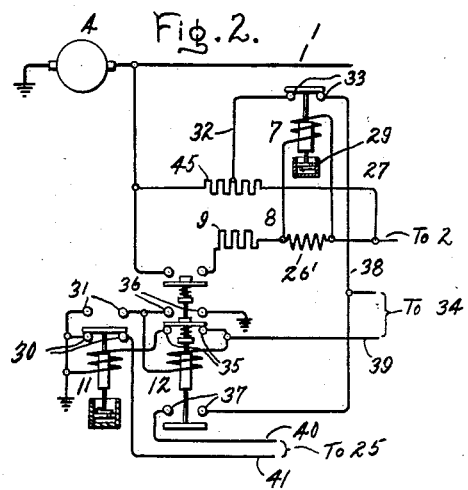
Inventor:
Gracie H. Roosevelt,
by
His Attorney.

Patented Nov. 4, 1924.

1,514,570

UNITED STATES PATENT OFFICE.

GRACIE HALL ROOSEVELT, OF TACOMA, WASHINGTON, ASSIGNOR TO GENERAL ELECTRIC COMPANY, A CORPORATION OF NEW YORK.

AUTOMATIC RECLOSING CIRCUIT-BREAKER SYSTEM.

Application filed August 7, 1923. Serial No. 656,197.

*To all whom it may concern:*

Be it known that I, GRACIE HALL ROOSEVELT, a citizen of the United States, residing at Tacoma, county of Pierce, State of Washington, have invented certain new and useful Improvements in Automatic Reclosing Circuit-Breaker Systems, of which the following is a specification.

My invention relates to automatic reclosing circuit breaker systems and particularly to such systems in which the reclosing of a circuit breaker between a supply circuit and a load circuit is controlled in accordance with the load connected to the load circuit.

In systems of distribution it is usually desirable to maintain a circuit breaker between a supply circuit and a distribution circuit closed at all times except when there is a short circuit connected across the conductors of the distribution circuit or the amount of useful load connected to the distribution circuit is such that the current supplied thereto exceeds a predetermined maximum value. For example in some railway systems, especially in cities where very heavy momentary overloads occur due to a number of cars being accelerated at the same time, it is desirable not to disconnect the overloaded portion of the system from the supply circuit under such conditions unless the current exceeds a maximum value. When, however, a short circuit occurs, it is desirable that the portion of the system on which the short circuit has occurred, should be disconnected from the supply circuit as soon as possible and before the current has increased to the maximum value required to open the circuit breaker under useful load conditions. Also it is desirable that the circuit breaker should remain disconnected from the supply circuit as long as the short circuit is connected to the disconnected portion of the distribution circuit and the useful load is greater than a predetermined value.

Therefore, it is evident that the automatic reclosing means for the circuit breaker should be arranged so that the circuit breaker is reclosed when the resistance of the load circuit is greater than a predetermined value if there is only a useful or normal load connected across the load conductors, and is not reclosed when there is a short circuit connected across the load conductors even though the resistance of the load circuit under such conditions is greater than the amount of resistance required to reclose the circuit breaker under useful load conditions. Consequently an automatic reclosing circuit breaker system which depends only upon the resistance or equivalent resistance of the load circuit for controlling the reclosing of the circuit does not accomplish the desired results. Such a system has to be arranged to respond to such a high value of resistance in order to prevent the circuit breaker from closing when there is a short circuit connected across the load conductors, that the circuit breaker is not reclosed in response to as low a value of load resistance as is desirable when there is only a useful load connected across the load conductors.

One object of my invention is to provide an automatic reclosing circuit breaker system which will effect the closing of a circuit breaker between a supply circuit and a load circuit in response to a predetermined value of load resistance when there is only a useful or normal load connected to the load conductors and which will not effect the closing of the circuit breaker in response to the same load resistance when there is a short circuit connected across the load conductors.

According to my invention I control the reclosing of the circuit breaker in accordance with the relative amounts of resistance and inductance of the load connected to the load circuit which are preferably determined by the rate at which the current changes in the load circuit when the circuit breaker is open and a current change is produced therein.

It is well known in the electrical art that when a constant direct current voltage is impressed upon an electric circuit containing resistance and inductance (assumed constant), the rate of change of the current in the circuit is equal to $\frac{E-ir}{L}$, where E is the voltage impressed upon the circuit, $r$ is the resistance of the circuit, $i$ is the instantaneous current flowing through the circuit, and L is the inductance of the circuit. Therefore it is evident that for a given load resistance and voltage the rate of change of the current varies inversely with the inductance of the circuit.

Since the time constant, which is equal to the inductance divided by the resistance, of a short circuit and the time constant of the conductors of a system of distribution, are usually very much smaller than the time constant of the useful or normal load connected to the load conductors, especially when direct current motors comprise a large part of the load, it is evident that when a predetermined direct current voltage is impressed upon a load circuit having a predetermined resistance and a predetermined current through the resistance, the rate of change of the current is greater when there is a short circuit connected across the load conductors than when there is only a useful load connected across the load conductors. Furthermore, it is evident that the rate of change of the current under short circuit conditions is greater than the rate of change of the current under useful load conditions both when the load circuit is supplied from some other source and when the load circuit is not supplied from some other source.

Therefore by providing means which is arranged to operate when the rate of change of current is above a predetermined value I am able to control the reclosing of a circuit breaker so that the circuit breaker is reclosed when the resistance of the load circuit is above a predetermined value and there is only the useful load connected across the load conductors, and so that the circuit breaker is prevented from being reclosed when there is either a short circuit connected across the load conductors or the resistance of the useful load is below a predetermined value. Preferably this means which operates in accordance with the rate of change of the current in the load circuit is a relay which is inductively connected to the load circuit, when the circuit breaker is open. This relay is so designed that if the rate of change is above a predetermined value the relay operates and prevents the circuit breaker from reclosing and causes another current change to be produced in the load circuit after a predetermined time. If, however, the rate of change is less than the predetermined value the relay does not operate and the circuit breaker is automatically reclosed.

My invention will be better understood from the following description taken in connection with the accompanying drawing and its scope will be pointed out in the appended claims.

In the accompanying drawing, Fig. 1 shows an automatic reclosing circuit breaker system embodying my invention and Fig. 2 is a modification of the arrangement shown in Fig. 1.

Referring to Fig. 1, 1 and 2 represent conductors of two circuits of a direct current electric system which are arranged to be connected together by a circuit breaker 3 of any suitable type. I prefer to use, however, a high speed circuit interrupter of the type disclosed in the Reissue Patent No. 15,441 granted to J. F. Tritle and assigned to the same assignee as this application. The conductors 1 and 2 may, for example, be considered as sections of a railway circuit, the conductor 1 being part of the supply circuit, which is connected to a source of current 4, and the conductor 2 being part of the load circuit which is connected to the load 5. The return circuit of the two circuits may be assumed to be through ground although it is apparent that it is immaterial whether a grounded return or a metallic return is used. The load circuit may also be connected to some other supply circuit not shown as the number of sources connected to the load does not materially affect the operation of my automatic reclosing system in accomplishing the desired results.

The circuit breaker 3, as is hereinafter described, is arranged to open automatically when the load current, under normal overload conditions, is more than a predetermined amount, and to trip at a materially smaller value of load current under short circuit conditions.

As mentioned above, it is desirable that the circuit breaker 3 should remain open as long as there is either a short circuit or an excessive normal overload connected to the load circuit, and should automatically reclose as soon as the short circuit is removed and the resistance of the load current is more than a predetermined amount. Therefore, it is necessary to provide suitable means which operates in accordance with these different load conditions when the circuit breaker 3 is open. This means in the system shown is the reclosing relay 7 which is inductively connected by means of the transformer 8 to a circuit including the conductor 1 of the supply circuit, a current limiting means 9 shown as a resistor, transformer 8 and the conductor 2 of the load circuit, when the circuit breaker 3 is open. When the circuit breaker 3 opens, a circuit for a time relay 11 is completed and this time relay effects the energization of a contactor 12 which is arranged to short circuit a portion of the resistor 9 so that a current change is produced in the circuit including the load and the primary winding of the transformer 8 and a voltage is impressed upon the winding of the reclosing relay 7. It is apparent that the magnitude of the voltage depends upon the rate of change of the current in the primary winding of the transformer 8. The relay 7 is arranged so that if the rate of change of the current through the primary winding of the transformer is above a predetermined value, the relay 7 operates and prevents the closing coil 25 of the circuit breaker 3 from being energized and effects the de-energization of the time relay 11 and the contactor 12 so that the above cycle of operation is repeated after another predetermined interval. If however the rate of change of the current through the circuit including the primary winding of the transformer 8 and the load is less than a predetermined value, the relay 7 does not operate and the necessary connections are completed to effect the closing of the circuit breaker 3. Preferably the relay 7 is designed so that after it opens the contacts 33 a predetermined time elapses after the coil of the relay is de-energized before the contacts 33 can close, thereby insuring that the contactor 12 is open before the contacts 33 are closed. This time delay may be obtained by any suitable means such as a dash pot 29. As shown the circuit breaker 3 comprises a switch contact member 15 which is held in its closed position by the attraction of the electromagnet 16 for the armature 17. The electromagnet 16 is provided with a holding coil 18 connected across the supply circuit by means of conductors 38, contacts 33 of the reclosing relay 7 and conductor 32, and arranged to set up a substantially constant flux in the core of the electromagnet 16. The armature 17 is adapted to bridge the pole pieces 19 and 20 of the electromagnet 16 and to be held there against the bias of the spring 21 until the armature is demagnetized by the conductor 22 which is in series with the supply and load circuits when the circuit breaker is closed. The conductor 22 is disposed in the air gap 23 which separates the pole pieces 19 and 20 and the direction of the magnetic flux set up by the conductor 22, when current is being supplied to the load circuit from the supply circuit is such that as the current increases the path of the flux set up by the holding coil 18 is changed, and in the drawing is deflected to the right of the conductor 22 through the air gap 23, thus substantially demagnetizing the armature 17 and permitting the switch contact member 15 to be moved to the open position in accordance with the bias exerted by the spring 21 when the current in the conductor exceeds a predetermined value. An inductive shunt 24 is provided around the conductor 22 for accelerating the increase of current in the conductor 22 when the current through the circuit breaker contacts is increased rapidly, as upon the occurrence of a short circuit. It will be readily understood by those skilled in the art that if the load current through the main contacts of the circuit breaker is gradually increased, the amount of load current required to demagnetize the armature 17 is greater than the amount required when rate of change is faster. Therefore the amount of load current required to open the circuit breaker varies with the load conditions.

The circuit breaker 3 is arranged to be moved to its closed position by a closing magnet 25, the circuit of which is controlled by the time relay 11, the contactor 12 and the reclosing relay 7.

When the main contacts of circuit breaker are closed, they short circuit the resistor 9 and the primary winding 26 of the transformer 8. The secondary winding 27 of the transformer 8 is connected to the coil of the reclosing relay 7 so that the voltages induced in the secondary winding 27 by the current changes in the primary winding, when the circuit breaker is open, is impressed upon the coil of the relay 7.

The relay 11 is preferably designed in any suitable manner, so that it does not open the contacts 30 and close the contacts 31 until after its coil has been energized a certain length of time but opens the contacts 31 and closes the contacts 30 as soon as its coil is de-energized. The coil of the time relay 11 is arranged to be connected across the supply circuit as soon as the circuit breaker 3 opens, the circuit of this coil being from the conductor 1 through conductor 32, contacts 33 of the reclosing relay 7, conductor 38, auxiliary contacts 34 on the circuit breaker 3, conductor 39, auxiliary contacts 35 on the contactor 12, coil of the relay 11 to ground. One purpose in making the relay 11 slow in responding is to allow a short time to elapse after the circuit breaker opens so that the conditions on the load circuit may become stable before an attempt is made to determine the electrical conditions of the load circuit.

The contactor 12 is arranged to close its main contacts as soon as its coil is energized by the closing of the contacts 31 of the time delay relay 11. The contactor 12 is provided with the auxiliary contacts 36 which are in parallel with the contacts 31 of the time relay 11 so that the contactor completes a locking circuit for itself which is independent of the contacts of the relay 11. The contactor is also provided with the auxiliary contacts 37 in the circuit of the closing coil 25 of the circuit breaker 3 so that the circuit breaker 3 can be closed only when the contactor 12 is closed. If desirable the contactor 12 may be arranged in any suitable manner so that the contacts 37 do not close until after the main contacts of the contactor have closed thereby giving the relay 7 time to operate before the circuit of the closing coil 25 of circuit breaker 3 is completed.

The operation of the automatic reclosing circuit breaker equipment shown in Fig. 1 is as follows: Upon the occurrence of an abnormal load when the circuit breaker 3 is closed the circuit breaker opens when the current through the conductor 22 exceeds a predetermined value. As soon as the circuit breaker opens, a small current is supplied to the load circuit through the resistor 9 and the primary winding of the transformer 8. Due to the high resistance of the current limiting means 9 the current change through the primary winding 26 is not sufficient to cause the relay 7 to operate. If for any reason, however, the relay 7 should operate at this time it would only delay the energization of the time relay 11 until the relay 7 is restored to its normal position after the current through the primary winding has reached a substantially steady value. The closing of the auxiliary contacts 34 of the circuit breaker 3, when it opens, completes the above traced circuit of the time relay 11. After a predetermined time, the relay 11 closes its contacts 31, thereby completing the circuit of the coil of the contactor 12 which is from the supply circuit conductor 1 through conductor 32, contacts 33 of the reclosing relay 7, conductor 38, contacts 34 of the circuit breaker 3, conductor 39, coil of the contactor 12, contacts 31 of the relay 11 to ground. The closing of the main contacts of the contactor 12 short circuits a portion of the resistor 9 so as to produce an increase in the current supplied to the load circuit through the primary winding 26 of the transformer 8.

When the contactor 12 closes, it opens its auxiliary contacts 35 so that the relay 11 is de-energized and closes its contacts 30. The opening of the contacts 31 of the relay 11 does ont effect the de-energization of the contactor 12 because the closing of the contacts 36 of the contactor 12 completes a locking circuit for the coil of the contactor.

If the load conditions are such that the rate of change of the current through the primary winding of the transformer 8 is not great enough to operate the relay 7, the closing of the contacts 37 of the contactor 12 and the closing of the contacts 30 of the relay 11 complete the circuit of the closing coil 25 of the circuit breaker 3 to close the circuit breaker. This circuit is from the supply circuit conductor 1, conductor 32, contacts 33 of the reclosing relay 7, conductor 38, auxiliary contacts 37 of the contactor 12, conductor 40 closing coil 25 of the circuit breaker 3, conductor 41, contacts 30 of the time relay 11 to ground.

The opening of the auxiliary contacts 34 of the circuit breaker 3, when it closes, de-energizes the coil of the contactor 12 so that it is restored to its normal condition thereby deenergizing the closing coil 25 of the circuit breaker.

If there is a short circuit or an excessive amount of useful load connected to the load circuit so that the rate of change of the current in the primary circuit is sufficient to operate the relay 7, the opening of the contacts 33 of this relay opens the circuits of the coils of the contactor 12 and the relay 11 so that all of these devices are restored to their normal positions. After a predetermined time determined by the setting of the dash pot 29, the reclosing relay 7 closes its contacts 33 and the time relay 11 again closes its contacts 31 so that the above cycle of operation is repeated and a current change is periodically produced in the load circuit until the load conditions become such that relay 7 does not operate to open its contacts 33 when the contactor 12 is energized. The circuit breaker 3 is then reclosed in the manner above described.

It is apparent that instead of having the resistor 9 and the primary winding of the transformer 8 normally connected in parallel with the main contacts of the circuit breaker and the contactor 12 arranged to produce the necessary current change in the load circuit to determine the load conditions by short circuiting a portion of the resistor, the current change may be effected by having the resistor and primary winding normally disconnected and having the contactor 12 arranged to complete the circuit through these devices in the manner shown in Fig. 2. Furthermore it is evident that instead of connecting the relay 7 to the secondary winding of a transformer, the same results may be obtained by connecting the relay in shunt around a reactor as shown in Fig. 2. Therefore, I wish it to be understood that in the specification and claims I intend to cover both of these connections by the expression "inductively connected."

Since the operation of the reclosing relay 7 does not depend upon the direction of the current through the primary winding 26 of the transformer 8, the reclosing equipment may also be used to determine the electrical conditions of the supply circuit when the load circuit is energized from some other source and the supply circuit is de-energized. In order, however, that the voltage impressed upon the control devices may be sufficient to operate them when either one of the circuits is energized and the other one is not, it is necessary to provide suitable means whereby the conductor 32 may be connected in such a manner to the circuit which is energized, that sufficient voltage is impressed thereon to operate the control device. One way in which the necessary voltage may be obtained is shown in Fig. 2 where the conductor 32 is connected to the middle point of a relatively high resistor 45 connected between the conductors 1 and 2. Any other suitable means, however, may be used to accomplish this result.

While I have shown and described several modifications of my invention I do not desire to be limited to the arrangements shown and described, but seek to cover in the appended claims all those modifications that fall within the true spirit and scope of my invention.

What I claim as new and desire to secure by Letters Patent of the United States, is:

1. In an automatic reclosing circuit breaker system, the combination of a supply circuit, a load circuit, a circuit breaker arranged to connect said supply circuit to said load circuit, closing means for said circuit breaker, means for producing a current change in said load circuit when said circuit breaker is open, and means operative in accordance with the rate of change of the current effected by the operation of said last mentioned means for controlling said closing means.

2. In an automatic reclosing circuit breaker system, the combination of a circuit breaker arranged to connect two circuits together, means adapted to be operated in response to an abnormal condition on one of said circuits to effect the opening of said circuit breaker, closing means for said circuit breaker, means adapted to effect after the circuit breaker is opened a change of current through the circuit on which the abnormal condition occurred, and means operative in accordance with the rate of change of the current effected by the operation of said last mentioned means for controlling said closing means.

3. In an automatic reclosing circuit breaker system, the combination of a circuit breaker arranged to connect two direct current circuits together, means adapted to be operated in response to an abnormal condition on one of said circuits to effect the opening of said circuit breaker, closing means for said circuit breaker adapted to be operated to effect the closing of said circuit breaker after the opening thereof due to an abnormal condition on one of said circuits, means adapted to effect after the circuit breaker is opened a change of current through the circuit on which the abnormal condition occurred, and a relay inductively connected to the circuit in which the current change is produced and arranged to control the operation of said closing means.

4. In an automatic reclosing circuit breaker system, the combination of a circuit breaker arranged to connect two direct current circuits together, closing means for said circuit breaker, a current limiting means, means operative when said circuit breaker is open to complete a circuit between said two direct current circuits including said circuit limiting means, and a relay inductively connected to the circuit including said circuit limiting means and said two direct current circuits and arranged to control the operation of said closing means.

5. In an automatic reclosing circuit breaker system, the combination of a circuit breaker arranged to connect two direct current circuits together, means adapted to be operated in response to an abnormal condition on one of said circuits to effect the opening of said circuit breaker, electroresponsive means connected and arranged to effect the automatic closing of said circuit breaker after said circuit breaker has been open a certain length of time, a time relay adapted to be energized in response to the opening of said circuit breaker, means controlled by said time relay for effecting a current change through the circuit on which the abnormal condition occurred, and a relay connected and arranged to operate in accordance with the rate of change of the current produced by said last mentioned means to control the operation of said electroresponsive means.

6. In an automatic reclosing circuit breaker system, the combination of a supply circuit, a load circuit, a circuit breaker arranged to connect said circuits together, closing means for said circuit breaker, means for periodically producing current changes in said load circuit when said circuit breaker is open, and means dependent upon the rate at which the current in said load circuit changes in response to the operation of said last mentioned means for controlling said last mentioned means and said closing means.

7. In an automatic reclosing circuit breaker system, the combination of a circuit breaker arranged to connect two direct current circuits together, means adapted to be operated in response to an abnormal condition on one of said circuits to effect the opening of said circuit breaker, a closing coil for said circuit breaker, a circuit for said closing coil arranged to be completed after said circuit breaker has been open a predetermined length of time, a time relay, a circuit for said time relay arranged to be completed in response to the opening of said circuit breaker, a current limiting device, an electroresponsive device arranged to complete between said direct current circuits, a circuit including said current limiting device, a circuit for said electroresponsive device arranged to be completed in response to the operation of said time relay, a reclosing relay inductively connected to the circuit arranged to be completed by said electroresponsive device, and contacts in the circuits of said closing coil, said time relay and said electroresponsive device controlled by said reclosing relay.

In witness whereof, I have hereunto set my hand this 31st day of July, 1923.

GRACIE HALL ROOSEVELT.